United States Patent

Saeva et al.

[11] 3,954,906
[45] May 4, 1976

[54] AMBIPOLAR PHOTOCONDUCTIVE COMPOSITION

[75] Inventors: Franklin D. Saeva, Webster, N.Y.;
Moshe Levy, Rehovot, Israel;
Stephen Strella, Pittsford, N.Y.;
James M. Pearson, Webster, N.Y.;
David J. Williams, Fairport, N.Y.

[73] Assignee: Xerox Corporation, Stamford, Conn.

[22] Filed: Oct. 30, 1974

[21] Appl. No.: 519,330

Related U.S. Application Data

[62] Division of Ser. No. 333,849, Feb. 20, 1973, Pat. No. 3,879,198.

[52] U.S. Cl. ................................ 260/874; 96/1 PC; 96/1.5; 96/1.6; 260/875; 260/878 R; 260/884; 260/886; 260/889; 260/897 C; 260/899; 428/457; 428/537

[51] Int. Cl.² .................. C08L 51/08; C08L 27/02; C08L 25/06; G03G 5/09

[58] Field of Search ............ 260/874; 96/1 PC, 1.5, 96/1.6; 117/34

[56] References Cited
UNITED STATES PATENTS

| | | |
|---|---|---|
| 3,246,627 | 4/1966 | Loeb et al. ............................ 117/95 |
| 3,549,361 | 12/1970 | Miller ................................ 96/1.5 R |
| 3,553,009 | 1/1971 | Hoegl et al. ........................ 117/34 |
| 3,600,216 | 8/1971 | Stewart ................................ 117/75 |
| 3,764,590 | 10/1973 | Mukoh et al. ...................... 260/874 |

OTHER PUBLICATIONS

Golden, J. H., Chemical Abstracts, "Bi(Anthracene--9,10--Dimethylene)(Tetrabenzo[2.2]Paracyclophane)," Vol. 56, p. 3432, Sec. C, (1962).

*Primary Examiner*—Murray Tillman
*Assistant Examiner*—Thurman K. Page
*Attorney, Agent, or Firm*—James J. Ralabate; James P. O'Sullivan; John H. Faro

[57] ABSTRACT

Ambipolar photoconductive composition comprising the product of the in situ polymerization of at least one cyclic compound of the formula:

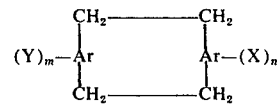

wherein Ar is a polyaromatic nucleus selected from the group consisting of diradicals of naphthalene, anthracene, pyrene and carbazole;

X and Y are independently selected from the group consisting of halogen, $NO_2$, $NH_2$; lower alkyl, phenyl, phenoxy, lower alkoxy, carboxy, hydroxyl, lower alkyl esters and aryl esters;

$m$ and $n$ can range from 0 to the total number of replaceable hydrogens on the polyaromatic nucleus;

in a polymeric host resin.

By the appropriate in situ polymerization of the above compound in the host polymer, it is possible to produce an interpretating photoconductive netword throughout the host polymer. The resulting photoconductive materials can be incorporated into an imaging member in an electrostatographic imaging system and function in either a positive or negative charging mode.

8 Claims, No Drawings

AMBIPOLAR PHOTOCONDUCTIVE COMPOSITION

This is a division of application Ser. No. 333,849, filed Feb. 20, 1973, and now U.S. Pat. No. 3,879,198.

BACKGROUND OF THE INVENTION

1. Field of the Invention — This invention relates to a photoconductive composition, an imaging member provided with an imaging layer of the above photoconductive composition, and an imaging method. More specifically, this invention concerns a photoconductive composition possessing good ambipolar discharge characteristics which can be readily formed by standard fabricating techniques into photoconductive films useful in electrostatographic imaging.

2. Description of the Prior Art — The formation and development of images on the imaging surfaces of photoconductive materials by electrostatic means is well known. The best known of the commercial processes, more commonly known as xerography, involves forming a latent electrostatic image on an imaging surface of an imaging member by first uniformly electrostatically charging the surface of the imaging layer in the dark and then exposing this electrostatically charged surface to a light and shadow image. The light struck areas of the imaging layer are thus rendered conductive and the electrostatic charge selectively dissipated in these irradiated areas. After the photoconductor is exposed, the latent electrostatic image on this image bearing surface is rendered visible by development with a finely divided colored electroscopic material, known in the art as "toner". This toner will be principally attracted to those areas on the image bearing surface which retain the electrostatic charge and thus form a visible powder image.

The developed image can then be read or permanently affixed to the photoconductor where the imaging layer is not to be reused. This latter practice is usually followed with respect to the binder-type photoconductive films (e.g. ZnO) where the photoconductive imaging layer is also an integral part of the finished copy.

In so-called "plain paper" copying systems, the latent image can be developed on the imaging surface of a reusable photoconductor or transferred to another surface, such as a sheet of paper, and thereafter developed. When the latent image is developed on the imaging surface of a reusable photoconductor, it is subsequently transferred to another substrate and then permanently affixed thereto. Any one of a variety of well known techniques can be used to permanently affix the toner image to the copy sheet, including overcoating with transparent films, and solvent or thermal fusion of the toner particles to the supportive substrate.

In the above "plain paper" copying system, the materials used in the photoconductive layer should preferably be capable of rapid switching from insulative to conductive to insulative state in order to permit cyclic use of the imaging surface. The failure of a material to return to its relatively insulative state prior to the succeeding charging sequence will result in a decrease in the maximum charge acceptance of the photoconductor. This phenomenon, commonly referred to in the art as "fatigue", has in the past been avoided by the selection of photoconductive materials possessing rapid switching capacity. Typical of the materials suitable for use in such a rapidly cycling system include anthracene, sulfur, selenium and mixtures thereof (U.S. Pat. No. 2,297,691); selenium being preferred because of its superior photosensitivity.

More recently, a number of organic photoconductive compositions have also been developed which reportedly possess the requisite speed and spectral response to provide commercially acceptable imaging surfaces; e.g. U.S. Pat. Nos. 3,037,861 and 3,484,237. Some of the principal advantages of these polymeric compositions over the traditional inorganic materials used in electrophotography are the relative ease of fabrication, comparatively low cost and inherent flexibility. Most such polymeric photoconductive materials, however, are not competitive with inorganic materials such as selenium with respect to their photosensitivity. The term "photosensitivity" is used throughout this disclosure to describe the relative rate of photoinduced discharge of a surface charge on an imaging layer of these materials; the more rapid its rate of photoinduced discharge, the more photosensitive a material. A number of organic materials are known to possess high light sensitivity, however, cannot be readily formed into coherent photoconductive films. The use of such intractable materials is possible but requires their dispersion in a host vehicle for fabrication of an imaging layer having the requisite physical and mechanical properties. Poly(9,10-dimethylene-anthracene) falls into this latter class of photoconductive materials. Typical of the teachings for the use of this material is U.K. Pat. No. 1,101,391 where this polymer is disclosed in a binder type photoconductive imaging layer. Where a polymeric material is physically dispersed throughout a binder as disclosed in the above noted British patent, its photosensitivity or rate of photoinduced discharge is concentration dependent. In other words, in order to enhance the rate of photoinduced discharge of a surface charge in such binder type films, additional amounts of polymeric photoconductive materials must be dispersed therein. As the concentration of this dispersed photoconductive material increases, the physical and mechanical properties of such films are usually adversely affected.

It is thus the object of the invention to remove this as well as related deficiencies in the prior art.

More specifically, it is an object of this invention to provide a photoconductive composition capable of ready fabrication into an imaging layer.

Another of the objects of this invention is to provide a photoconductive composition having good ambipolar photodischarge characteristics.

Still yet another of the objects of this invention is to provide an easily molded photoconductive composition from highly intractable photoconductive materials.

Further objects of this invention involve the use of the above photoconductive composition as an integral component of an imaging member and the further use of said imaging member in an imaging method.

SUMMARY OF THE INVENTION

The above and related objects are achieved by providing an ambipolar photoconductive composition comprising the product of the in situ polymerization of at least one cyclic compound of the formula:

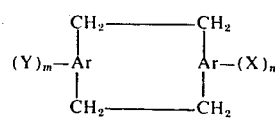

wherein Ar is a polyaromatic nucleus selected from the group consisting of diradicals of naphthalene, anthracene, pyrene and carbazole;

X and Y are independently selected from the group consisting of helogen, $NO_2$, $NH_2$; lower alkyl, phenyl, phenoxy, lower alkoxy, carboxy, hydroxyl, lower alkyl esters and aryl esters;

m and n can range from 0 to the total number of replaceable hydrogens on the polyaromatic nucleus; in a host resin.

The resulting polymeric product is preferably prepared by thermal initiation of polymerization of an intimate admixture of the above compound(s) in the host resin at temperatures in excess of 180°C. In the most preferred embodiments of this invention, the host polymer is heated until molten and the monomer then dispersed therein. After uniform dispersion of the above cyclic compound(s) in the host polymer the temperature of the molten host matrix is increased above 180°C and thus in situ polymeriztion initiated. The preferred cyclic compounds of this invention are cyclo bis (anthracene-9,10-dimethylene) and cyclo bis (napthalene-1,4-dimethylene).

DESCRIPTION OF THE INVENTION INCLUDING PREFERRED EMBODIMENTS

In preparation of the ambipolar photoconductive compositions of this invention, the cyclic compound(s) and host polymer are initially intimately blended and then in situ polymerization initiated at temperatures in excess of 180°C. The relative concentration of the cyclic compound(s) added to the charge will vary with the degree of photosensitivity and the mechanical properties desired. Good results are obtained when from about 0.5 to about 50 weight percent, based upon the combined weight of the essential components of the composition, of cyclic compound(s) is in situ polymerized in any of a number or combination of host polymers. In the preferred photoconductive compositions of this invention, the charge comprises about 5 to about 20 weight percent of the above cyclic compounds.

The cyclic compound(s) suitable for use in these photoconductive compositions in certain instances, are commercially available or can be prepared from relatively inexpensive starting materials by techniques fully disclosed in the literature; see, for example, Golden, *J. Chem. Soc.* 3741 (1961). Representative of the cyclic compounds which can be employed in these photoconductive compositions include cyclo bis (anthracene-9,10-dimethylene); cyclo bis (anthracene-1-bromo-9,10-dimethylene); cyclo bis (anthracene-1-chloro-9,10-dimethylene); cylco bis (anthracene-1-amino-9,10-dimethylene); cyclo bis (anthracene-1-nitro-9,10-dimethylene); and cyclo bis (anthracene-1-methyl-9,10-dimethylene).

The host resin of this composition can be any one of a number or combination of thermoplastic or thermoset organic polymers which are substantially miscible with the above cyclic compounds and are thermally stable at temperatures prevailing during in situ polymerization of these materials. These host resins are further characterized as being inherently inert, that is, being insulating materials and generally not regarded as photoconductive in and of themselves. In addition, these resins must be further compatible with the specific type of imaging mode in which the photoconductive compositions is to be ultimately used. For example, if the imaging layer of the photoconductive element is intended for use in a "Frost" or deformable imaging system, it must be thermoplastic and have a glass transition temperature (Tg) preferably only be somewhat above room temperature. Ordinarily, thermoplastic host resins having Tg's in the range of from about 35° to about 50°C are suitable for use in such deformable photoconductive imaging layers.

Typical of the host resins which are suitable for use in photoconductive compositions of this invention include polyethylene; polystyrene; poly (1-vinyl-naphthalene); polyvinylchloride; polypropylene; styrene-n-butylmethacrylate copolymers; styrenebutadiene copolymers; and mixtures thereof.

The photoconductive compositions of this invention can be optionally doped with activators and dyestuff sensitizers in order to enhance the photodischarge characteristics and spectral response of the photoconductive composition.

Ordinarily, the activator incorporated into the photoconductive composition should be either an electron donor or an electron acceptor depending upon the relative electron affinity of the photoconductive material. With respect to compositions prepared from cyclo bis (anthracene-9,10-dimethylene) and a host resin, both electron donor and electron acceptor materials can be used as sensitizers since the anthracene groups of a resulting photoconductive composition will form charge transfer complexes with both.

Representative of electron donor sensitizers which can be incorporated into the photoconductive compositions of this invention include benzidine; N,N,N',N'-tetramethylbenzidine; 4,4'-methylenedianiline; 4,4'-methylenebis(N,N-dimethylaniline); 3,3'-dimethoxybenzidine; N,N-diphenylbenzidine; N-phenyl-o-phenylenediamine; N-phenyl-p-phenylenediamine; anisole; o-anisidine; m-anisidine; p-anisidine; o-methylanisole; m-methylanisole; b-methylanisole; 3-amino-N-ethylcarbazole; 2,3-diphenylindole; and mixtures thereof.

Still yet another sensitizers which can be optionally added to the photoconductive compositions of this invention include electron acceptors such as 2,3-dichloro-5,6-dicyano-p-benzoquinone; tetracyanoethylene; 2,6-dinitro-p-benzoquinone; tetracyano-p-benzoquinone; 2,3-dicyano-p-benzoquinone; 7,7,8,8-tetracyano-p-dimethylenequinone; o-bromanil; o-chloranil; p-bromanil; p-chloranil; p-iodanil; trichloro-p-benzoquinone; 2,6-dibromo-p-benzoquinone; 2,6-dichloro-p-benzoquinone; 2,5-dichloro-p-benzoquinone; and mixtures thereof.

The concentration of such activators which can be present in the above photoconductive compositions will vary widely depending upon the degree of sensitization required, and the mechanical and physical property specifications of the imaging layer. The upper concentration of such ingredients is generally limited by the adverse changes in physical properties accompanying such excessive additions. The inclusion of anywhere from about 0.1 to about 25 weight percent, based upon the total weight of the composition, of activator to the charge during polymerization should provide the desired degree of enhancement of photosensitivity without adversely altering the composition's mechanical or physical properties and ease of thermoforming.

The range of spectral response of these photoconductive compositions can also be extended by the addition of from about 0.1 to about 4 weight percent of dyestuff sensitizers to the charge during polymerization. Any standard dyestuff sensitizer can be used, the following being but a representative list: triarylmethane dyestuffs such as Malachite Green, Brilliant Green, Victoria Blue B, Methyl Violet, Crystal Violet, Acid Violet 6B; xanthene dyestuffs, namely rhodamines, such as Rhodamine B, Rhodamine 6G, Rhodamine G Extra, and Fast Acid Eosin G, as also phthaleins such as Eosin S, Eosin A, Erythrosin, Phloxin, Phloxin, Rose Bengal, and Fluorescein; thiazine dyestuffs such as Methylene Blue; acridine dyestuffs such as Acridine Yellow, Acridine Orange and Trypaflavine; and cyanine dyestuffs such as Pinacyanol, Cryptocyanine and Cyanine.

The photoconductive product of this invention can be prepared in at least two ways: either, the individual components are initially blended into an intimate mixture and then heated sufficiently to initiate in situ polymerization; or alternatively, the host resin can be heated until molten and then the other individual components stirred into its fluid matrix. Preferably, the temperature of the molten resin should be maintained below the thermal initiation temperature of the cyclic monomeric compound until the compound has been uniformly dispersed throughout its matrix. Once this preferred degree of dispersion has been attained, the temperature of the entire mass is raised sufficiently to crack the cyclic compound and thus initiate polymerization of this compound with itself and the host resin. The minimum temperature required to crack the cyclic compound(s) is about 180°C, and most of the host resins are molten below this temperature. The upper limit on the temperature prevailing during polymerization is determined in large measure by the resistance of these host polymers to thermal and oxidative degradation. Depending upon the particular resin selected, the temperature of the in situ polymerization of the cyclic compound(s) in the host resin will generally not exceed 350°C and preferably not about 250°C.

The following series of reactions is representative of thermal initiation of polymerization of this cyclo bis (anthracene-9,10-dimethylene) in a polystyrene host polymer at 250°C.

EQUATION I

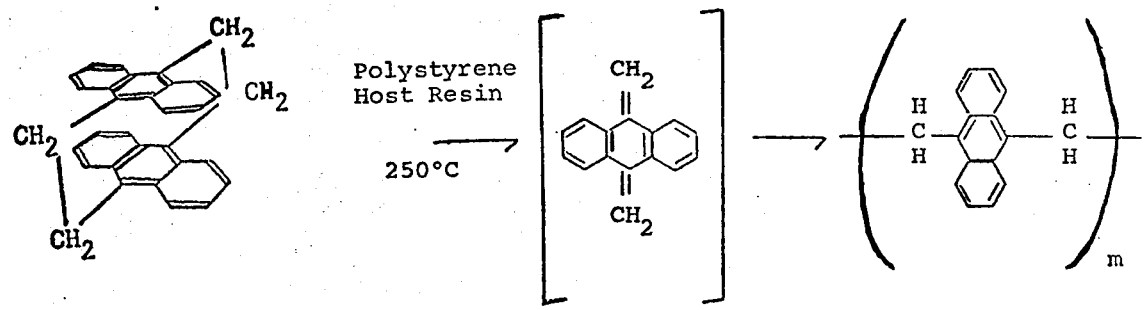

where $m$ is at least 4.

Upon thermal cracking of the cyclic compound(s), it is converted to a metastable dimethane quinone which in turn polymerizes with itself and interpolymerizes with the host resin. The extent of polymerization of this compound is believed to be quite extensive. The resultant product, however, is only amenable to analysis for determination of the degree of polymerization of the cyclic compound and its degree of interpolymerization with the host polymer by indirect methods.

Where, for example, cyclo bis (anthracene-9,10-dimethylene) is polymerized in polystyrene in a high shear Brabender Mixer, the probability of the interpolymerization of the above compound and host resin is enhanced due to the homogeneity of the dispersion and possibly the rupture of the polystyrene polymeric chains. The interpolymerization of the above compound and polystyrene is allowed to proceed for about 10 minutes and then the resultant product removed from the hopper and suspended in toluene. After being allowed to stand overnight, the suspension is contacted with methanol and vigorously agitated. The resulting yellow color developed is characteristic of precipitated polystyrene. Upon recovery of this polymeric material, it is further evaluated with solvents known for their compatibility with polystyrene. In each instance, the polymeric product was soluble or capable of forming a colloidal dispersion in the solvent. Since poly(anthracene-9,10-dimethylene) is known to be insoluble in many of the same solvents, especially toluene, it appears that the polymeric product is a complex formed by interpolymerization of the former cyclic compound and the host polymer and interpolymerization of poly-(anthracene-9,10-dimethylene) and the host polymer. The above procedure, when repeated with prepolymerized poly(anthracene-9,10-dimethylene) in place of the compound, cyclo bis(anthracene-9,10-dimethylene), tends to confirm the previous hypothesis. Upon exposure of the recovered polymeric products to these same solvents, the poly (anthracene-9,10-dimethylene) precipitates out and the polystyrene remains in colloidal suspension.

The photoconductive composition prepared under these high shear conditions possesses photoconductivity comparable to the materials prepared by routine melt polymerization techniques. The polymeric product thus obtained is believed to comprise a random interpretating network of photoconductive material throughout the host resin.

After polymerization, the resultant polymeric products are applied in a substantially uniform coherent and adherent film to a conductive substrate. The method of application will vary with the method of preparation of the polymeric product.

For example, where the cyclic compound and host polymer are melt polymerized, the polymeric products are usually cast from the melt or allowed to cool and then subsequently molded on a conductive base member. In the event that the polymerization takes place under high shear conditions, the resultant gelatinous polymeric products are usually cast from a toluene suspension. In any event, the photoconductive films thus produced must be of a substantial uniform thickness and form a coherent and adherent photoconductive layer on the conductive base member. Film thickness of such photoconductive layers will generally range from about 5 to about 50 microns; with photoconductive films in the range of about 15 to about 20 microns being preferred. Film thicknesses can be readily controlled, especially in solvent casting of the polymerization products, by merely adjusting the viscosity of the polymeric slurry or by mechanical means, such as with a doctor blade having an adjustable wet gap setting.

The photoconductive characteristics of photoconductive films prepared from these polymeric products are evaluated on a Xerox Model D copier equipped with a 100 Watt tungsten lamp (and shutter) located at a distance of 25 centimeters from the surface of the photoconductive film. The Model D is also outfitted with an electrometer and a potentiometric pen recorder for graphic documentation of the voltage-time discharge behavior.

The Examples which follow further define, describe and illustrate preparation and use of the polymerization procedure of this invention in an electrophotographic imaging system. Conditions and apparatus not specifically set forth in the following specific embodiments are presumed to be standard or as hereinbefore described. Parts and percentages appearing in such Examples are by weight unless otherwise specified.

EXAMPLE I

A photoconductive composition is prepared from cyclo bis(anthracene-9,10-dimethylene) and a solid polystyrene resin.

Ninety parts polystyrene are charged to a glass-lined reaction kettle, heated with agitation to 150°C until uniformly melted, 10 parts cyclo bis(anthracene-9,10-dimethylene) added, and the mixture stirred for an additional ten minutes thus producing a substantially uniform dispersion of the two materials. The temperature of this dispersion is then gradually increased to about 250°C, the charge then being maintained at this temperature for an additional 10 minutes.

The polymeric product thus obtained is cast on aluminum plates. Film thickness of the polymeric overcoating is maintained within a range of about 15–20 microns by adjustment of the viscosity of the melt. Once the photoconductive film has sufficiently cured, its charge acceptance and photodischarge properties are evaluated. Films prepared as described above were charged to a positive potential of 170 volts, illuminated by a 150 Watt high intensity lamp from a distance of 12 inches and the residual voltage recorded after 5 seconds. This procedure is repeated with the same films except that they are now charged to a negative potential of 280 volts. The rate of photodischarge for positively charged film is 600; and the negatively charged film 750.

EXAMPLES II to V

The procedure used in synthesis and evaluation of the photoconductive films of Example I are repeated, except for variation in the relative concentration of the bis(anthracene-9,10-dimethylene) and the polystyrene resin.

| Ex. No. | Monomer Concentration | Host Resin Concentration | Charge | Rate of Photo-discharge (v/sec) |
|---|---|---|---|---|
| II | 1 part | 99 parts | +350 | 10 |
| III | 2.5 parts | 97.5 parts | +380 | 30 |
| IV | 5 parts | 95 parts | +360 | 80 |

EXAMPLES V to XIX

A series of photoconductive plates are prepared by compression molding polymeric products prepared from the following photoconductive compositions at 250°C and 10,000 psi for 5 minutes on aluminum plates. The thickness of the films obtained averaged about 20 microns. In each of the films the cyclic compound is cyclo bis(anthracene-9,10-dimethylene).

| Example No. | Host Resin - Parts | Cyclic compound - Parts | Charge Acceptance (Volts) | Rate of Photo-discharge (v/sec) |
|---|---|---|---|---|
| V | polyethylene 99.5 | 0.5 | +450 | 3 |
|  |  |  | −450 | 6 |
| VI | polyethylene 98 | 2 | +320 | 15 |
|  |  |  | −320 | 15 |
| VII | polyethylene 95 | 5 | +300 | 100 |
|  |  |  | −450 | 200 |
| VIII | polyethylene 90 | 10 | +300 | 170 |
|  |  |  | −500 | 400 |
| IX | polyethylene 80 | 20 | +200 | 150 |
|  |  |  | −220 | 300 |
| X | polyethylene 50 | 50 | +50 | 150 |
|  |  |  | −75 | 200 |
| XI |  | 100 | NO FILM FORMATION |  |
| XII | polyvinylchloride 90 | 10 | +150 | 250 |
|  |  |  | −250 | 400 |
| XIII | polystyrene 99 | 1 | +250 | 5 |
|  |  |  | — |  |
| XIV | polystyrene 95 | 5 | +280 | 400 |
|  |  |  | −320 | 500 |
| XV | polystyrene 90 | 10 | +170 | 600 |
|  |  |  | −280 | 750 |
| XVI | polystyrene 80 | 20 | +150 |  |
|  |  |  | — |  |
| XVII | polystyrene 50 | 50 | +50 | 500 |
| XVIII | styrene/acrylate copolymer (65/35 mole ratio) | 10 | +150 | 250 |
|  |  |  | −250 | 400 |
| XIX | **Krayton 90 - Shell Chemical Co. (styrene-butadiene-styrene block terpolymer) | 10 | +150 | 250 |
|  |  |  | −250 | 200 |
|  |  |  | +210 | 0 |
| XX | Poly(1-vinyl Naphthalene) 90 | 10 | 180 | 180 |

EXAMPLE XXI

The photoconductive imaging member prepared in Example I is corona charged to a positive potential of 600 volts, exposed to a light and shadow image from a distance of 12 inches for 5 seconds, whereby the surface charge is selectively dissipated on the surface of the photoconductive layer in the light struck areas forming a latent electrostatic image thereon. This image is rendered visible by cascading a relatively negatively charged developer powder over the surface of the photoconductive layer. The developer is principally attracted to those regions of the photoconductive layer retaining the surface charge. The powder image is then transferred to a piece of untreated paper by well known techniques and thermally fused thereto. The photoconductive layer is subjected to a neutralizing corona discharge, cleaned and the photocopy cycle repeated.

The resultant copies are of commercially acceptable quality with respect to image intensity and resolution.

EXAMPLE XXII

The imaging sequence of Example XXI is repeated except for the charging of the photoconductive surface to a negative potential of 800 volts and the development of a resulting latent electrostatic image with a relatively positive charged developer powder. Copy quality is equivalent to that attained in Example XXI.

EXAMPLES XXIII to XXVII

The imaging sequences of Examples XXI and XXII are repeated except for the substitution of the imaging members prepared in Examples VIII, XII, XV, XVIII and XIX respectively. Copy quality with respect to image intensity and resolution varies directly with the charge acceptance of the photoconductive layer; the layers having the greater charge acceptance capacity producing the superior copies.

EXAMPLE XXVIII

Example I is repeated except that in in situ polymerization of cyclo bis(anthracene-9,10-dimethylene) in polystyrene is carried out in a high shear Brabender Mixer. Subsequent to termination of polymerization, the gelatinous polymerization products are suspended in toluene and cast on aluminum plates. The imaging members thus produced are evaluated as hereinbefore described and exhibit comparable photodischarge characteristics.

What is claimed is:

1. A photoconductive composition comprising a product prepared by, a. intimately mixing from about 0.5 to about 50 weight percent of at least one cyclic compound of the formula:

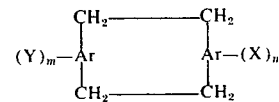

wherein Ar is a polyaromatic nucleus selected from the group consisting of diradicals of napthalene, anthracene, pyrene and carbazole; X and Y are independently selected from the group consisting of halogen, $NO_2$, $NH_2$, lower alkyl, phenyl, phenoxy, carboxy, hydroxyl, lower alkyl esters and aryl esters; and $m$ and $n$ range from 0 to the total number of replaceable hydrogens on the polyaromatic nucleus;

in an insulating polymeric host resin, said host resin being a solid at room temperature, substantially miscible with the above cyclic compounds, substantially non-photoconductive and thermally stable at temperatures prevailing during the polymerization of said cyclic compounds; and b. heating the mixture to a temperature in excess of about 180° C. up to about 350° C, said temperature being sufficient to cause pyrolytic cleavage of the cyclic compound within the polymeric host resin yet insufficient to effect thermal and/or exidative degradation of the host resin.

2. The photoconductive composition of claim 1 prepared from about 5 to about 20 weight percent cyclic compound(s) and about 80 to about 95 weight percent polymeric host resin.

3. The photoconductive composition of claim 1, wherein the cyclic compound is cyclo bis(anthracene-9,10-dimethylene).

4. The photoconductive composition of claim 1, wherein the cyclic compound is cyclo bis (naphthalene-1,4-dimethylene).

5. The photoconductive composition of claim 1, wherein the polymeric host resin is polyethylene.

6. The photoconductive composition of claim 1, wherein the polymeric host resin is polystyrene.

7. The photoconductive composition of claim 1, wherein the polymeric host resin is polyvinylchloride.

8. The photoconductive composition product of claim 1, wherein the cyclic compound(s) is polymerized in the polymeric host resin at a temperature of from about 200° to 250°C.

* * * * *